(12) United States Patent
Wang (10) Patent No.: US 11,809,671 B2
(45) Date of Patent: Nov. 7, 2023

(54) PRESSURE-SENSITIVE WRITING BOARD AND PRESSURE-SENSITIVE WRITING DEVICE

(71) Applicant: BOE Technology Group Co., Ltd., Beijing (CN)

(72) Inventor: Zifeng Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/575,961

(22) Filed: Jan. 14, 2022

(65) Prior Publication Data
US 2022/0308691 A1  Sep. 29, 2022

(30) Foreign Application Priority Data
Mar. 23, 2021 (CN) .......................... 202110309183.5

(51) Int. Cl.
*G06F 3/046* (2006.01)
*G02F 1/1333* (2006.01)
*G06F 3/041* (2006.01)

(52) U.S. Cl.
CPC .......... *G06F 3/046* (2013.01); *G02F 1/13338* (2013.01); *G06F 3/0412* (2013.01); *G06F 3/0416* (2013.01)

(58) Field of Classification Search
CPC ...... G06F 3/046; G06F 3/0412; G06F 3/0416; G06F 3/0414; G06F 3/0421; G02F 1/13338
See application file for complete search history.

(56) References Cited

U.S. PATENT DOCUMENTS

| | | | | |
|---|---|---|---|---|
| 2013/0321287 | A1* | 12/2013 | Adamson | G06F 1/3271 345/173 |
| 2014/0043547 | A1* | 2/2014 | Marhefka | G06F 3/038 349/12 |
| 2015/0145799 | A1* | 5/2015 | Katsurahira | G06F 3/041 345/173 |
| 2018/0143475 | A1* | 5/2018 | Li | G06F 3/017 |
| 2019/0324308 | A1* | 10/2019 | Liao | G02F 1/13338 |

FOREIGN PATENT DOCUMENTS

CN   110427123 A * 11/2019 ........... B32B 17/064

* cited by examiner

*Primary Examiner* — Liliana Cerullo
(74) *Attorney, Agent, or Firm* — IPro, PLLC (57) ABSTRACT

The present disclosure provides a pressure-sensitive writing board and a pressure-sensitive writing device. The pressure-sensitive writing board includes a pressure-sensitive writing panel and a writing monitoring unit. The writing monitoring unit is configured to determine position information about a writing tool at a writing region of the pressure-sensitive writing panel, convert the position information into writing trajectory information, and store the writing trajectory information.

15 Claims, 2 Drawing Sheets

PRESSURE-SENSITIVE WRITING BOARD AND PRESSURE-SENSITIVE WRITING DEVICE

CROSS-REFERENCE TO RELATED APPLICATION

This application claims a priority to Chinese Patent Application No. 202110309183.5 filed on Mar. 23, 2021, which is incorporated in its entirety by reference herein.

TECHNICAL FIELD

The present disclosure relates to the field of writing tools, in particular to a pressure-sensitive writing board and a pressure-sensitive writing device.

BACKGROUND

Liquid crystal writing boards have been widely used in such scenarios as teaching and conversations due to powder-free writing and a same writing feel as a traditional blackboard.

SUMMARY

In one aspect, the present disclosure provides in some embodiments a pressure-sensitive writing board, including: a pressure-sensitive writing panel configured to form a writing region; and a writing monitoring unit configured to determine position information about a writing tool at the writing region, convert the position information into writing trajectory information, and store the writing trajectory information. The pressure-sensitive writing panel is further configured to present the writing trajectory information at the writing region.

In a possible embodiment of the present disclosure, the writing monitoring unit includes: two infrared touch frames arranged opposite to each other at two ends of the pressure-sensitive writing panel respectively, each infrared touch frame being provided with a plurality of infrared transmitters and a plurality of infrared receivers corresponding to the plurality of infrared transmitters respectively, an infrared light net being formed between the plurality of infrared transmitters and the plurality of infrared receivers, a part of infrared light in the infrared light net being shielded when a writing operation is performed by the writing tool at the writing region, and a monitoring signal being generated by the infrared receiver corresponding to a shielded region; a controller coupled to each infrared transmitter and each infrared receiver, and configured to determine the writing trajectory information about the writing tool at the writing region in accordance with the monitoring signal; and a storage unit coupled to the controller and configured to store the writing trajectory information.

In a possible embodiment of the present disclosure, the writing tool includes a first electromagnetic signal generator. The writing monitoring unit includes: an electromagnetic induction layer attached to a surface of the pressure-sensitive writing panel away from a writing surface of the pressure-sensitive writing panel, and configured to receive an electromagnetic signal from the first electromagnetic signal generator; a controller coupled to the electromagnetic induction layer and configured to generate the writing trajectory information in accordance with the electromagnetic signal; and a storage unit coupled to the controller and configured to store the writing trajectory information.

In a possible embodiment of the present disclosure, the writing monitoring unit further includes a display panel coupled to the controller and configured to display a content corresponding to the writing trajectory information and/or a content played by a terminal coupled to the display panel, and one or more pressure-sensitive writing panels are arranged at one or more sides of the display panel and spliced with the display panel.

In a possible embodiment of the present disclosure, the controller is further configured to control the pressure-sensitive writing panel to display the played content synchronously.

In a possible embodiment of the present disclosure, the controller is further configured to determine mapping coordinates of the played content in the pressure-sensitive writing panel in accordance with a correspondence between coordinates in the display panel and coordinates in the pressure-sensitive writing panel, and control the pressure-sensitive writing panel to display a writing region corresponding to the mapping coordinates.

In a possible embodiment of the present disclosure, the pressure-sensitive writing panel includes a pressure-sensitive display module configured to present a writing trajectory in a predetermined color in accordance with the writing trajectory information at a region where a pressure is applied.

In a possible embodiment of the present disclosure, the pressure-sensitive display module is further configured to erase the writing trajectory under the effect of a predetermined pulse electric field.

In a possible embodiment of the present disclosure, the pressure-sensitive writing panel further includes a protection layer attached to a surface of the pressure-sensitive display module where a pressure is applied.

In a possible embodiment of the present disclosure, the protection layer includes a flexible soft film subjected to atomization and hardening treatment.

In a possible embodiment of the present disclosure, the writing monitoring unit includes an electromagnetic induction layer attached to a surface of the pressure-sensitive writing panel away from a writing surface of the pressure-sensitive writing panel, a maximum value of a total thickness of the pressure-sensitive writing panel is positively associated with a sum of densities of antenna arrays on the electromagnetic induction layer, and the total thickness of the pressure-sensitive writing panel is a distance between a surface of the protection layer away from the pressure-sensitive display module and a surface of the pressure-sensitive display module adjacent to the electromagnetic induction layer.

In a possible embodiment of the present disclosure, the electromagnetic induction layer includes an antenna board, conductive lines extending in a first direction and a second direction are arranged on the antenna board, and the second direction is perpendicular to the first direction.

In a possible embodiment of the present disclosure, the pressure-sensitive display module includes: a first substrate and a second substrate arranged opposite to the first substrate, the first substrate being a flexible substrate; a first conductive layer attached to the first substrate and facing the second substrate; a second conductive layer attached to the second substrate and facing the first substrate; and a liquid crystal layer arranged between the first conductive layer and the second conductive layer.

In a possible embodiment of the present disclosure, when a pressure is applied to the first substrate, an arrangement mode of liquid crystals in the liquid crystal layer corresponding to a region of the first substrate where the pressure is applied changes in such a manner as to reflect light at a predetermined wavelength, so as to present the writing trajectory in the predetermined color. When the predetermined pulse electric field is applied to the first conductive layer and the second conductive layer at the region where the writing trajectory in the predetermined color is presented, the arrangement mode of the liquid crystals in the liquid crystal layer corresponding to the region where the writing trajectory in the predetermined color is presented restores to its initial state so as to erase the writing trajectory.

In a possible embodiment of the present disclosure, the liquid crystal layer includes bistable cholesteric liquid crystals.

In a possible embodiment of the present disclosure, the second substrate includes a black reflective substrate.

In a possible embodiment of the present disclosure, the first conductive layer includes a plurality of first conductive grids, and the second conductive layer includes a plurality of second conductive grids corresponding to the plurality of first conductive grids respectively.

In another aspect, the present disclosure provides in some embodiments a pressure-sensitive writing device including an erasing tool and the above-mentioned pressure-sensitive writing board.

In a possible embodiment of the present disclosure, the erasing tool includes a second electromagnetic signal generator. The writing monitoring unit in the pressure-sensitive writing board includes: an electromagnetic induction layer attached to a surface of the pressure-sensitive writing panel away from a writing surface of the pressure-sensitive writing panel and configured to receive an electromagnetic signal from the second electromagnetic signal generator; and a controller coupled to the electromagnetic induction layer, and configured to determine a position of the second electromagnetic signal generator in accordance with the electromagnetic signal. The controller is further configured to erase the writing trajectory information at a predetermined position in accordance with the position of the second electromagnetic signal generator.

In a possible embodiment of the present disclosure, the writing monitoring unit includes: two infrared touch frames arranged opposite to each other at two ends of the pressure-sensitive writing panel respectively, each infrared touch frame being provided with a plurality of infrared transmitters and a plurality of infrared receivers corresponding to the plurality of infrared transmitters respectively, an infrared light net being formed between the plurality of infrared transmitters and the plurality of infrared receivers, a part of infrared light in the infrared light net being shielded when the erasing tool moves at the writing region, and a monitoring signal being generated by the infrared receiver corresponding to a shielded region; and a controller coupled to each infrared transmitter and each infrared receiver, and configured to determine position information about the erasing tool at the writing region in accordance with the monitoring signal. The controller is further configured to erase the writing trajectory information at a predetermined position in accordance with the position information about the erasing tool.

The other features and advantages will be described hereinafter, and may become apparent or understandable partially from the embodiments of the present disclosure. The objects and the other advantages of the present disclosure may be implemented and acquired through structures specified in the description, claims and drawings.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

The present disclosure will be described hereinafter in details in conjunction with the drawings and embodiments, so as to facilitate the understanding of how to solve the technical problems and achieve the technical effects through the technical means. It should be appreciated that, in the case of no conflict, the embodiments of the present disclosure and the features therein may be combined, which also fall within the scope of the present disclosure.

Generally, after a writing on the pressure-sensitive writing board, a user may erase contents through one-key erasing or topical erasing for a new content. However, when the contents on the pressure-sensitive writing board have been erased, it is impossible for the user to know the erased contents subsequently, especially in the case that the contents are erased erroneously, resulting in convenience for the user. Hence, the conventional pressure-sensitive writing board is less practical.

A main object of the present disclosure is to provide a pressure-sensitive writing board and a pressure-sensitive writing device, so as to improve the practicability of the pressure-sensitive writing board in the related art.

Figure 1:
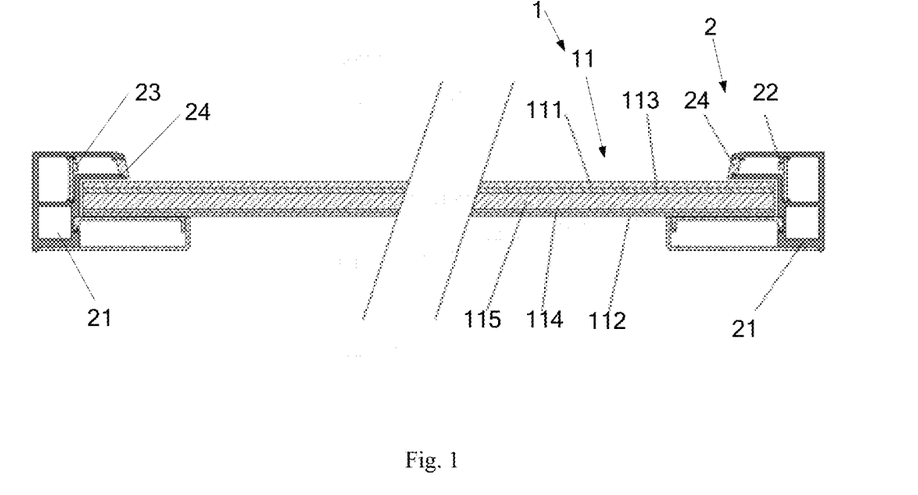
FIG. 1 is a schematic view showing a pressure-sensitive writing board according to one embodiment of the present disclosure.

The present disclosure provides in some embodiments a pressure-sensitive writing board which, as shown in FIG. 1, includes a pressure-sensitive writing panel 1 and a writing monitoring unit 2. The pressure-sensitive writing panel 1 is configured to form a writing region. The writing monitoring unit 2 is configured to determine position information about a writing tool at the writing region, and convert the position information into writing trajectory information, and store the writing trajectory information. The pressure-sensitive writing panel 1 is further configured to present the writing trajectory information at the writing region.

The pressure-sensitive writing panel 1 is configured to present contents written by the writing tool on a surface of the pressure-sensitive writing panel 1. The writing monitoring unit 2 is configured to determine the position information about the writing tool on the surface of the pressure-sensitive writing panel 1, convert the position information into the writing trajectory information, and store the writing trajectory information.

In some embodiments of the present disclosure, as shown in FIG. 1, the writing monitoring unit 2 includes a controller (not shown), a storage unit (not shown), and two infrared touch frames 21 arranged opposite to each other at two ends of the pressure-sensitive writing panel 1 respectively. The storage unit and/or the controller may be integrated with one of the infrared touch frames 21.

As shown in FIG. 1, each infrared touch frame 21 is provided with a plurality of infrared transmitters 22 and a plurality of infrared receivers 23 corresponding to the plurality of infrared transmitters 22 respectively (in FIG. 1, the infrared transmitter 22 and the infrared receiver 23 are marked for two infrared touch frames 21 respectively, but actually each infrared touch frame 21 is provided with both the infrared transmitters 22 and the infrared receivers 23). The controller is coupled to each infrared transmitter 22 and each infrared receiver 23. Each infrared transmitter 22 is configured to transmit an infrared signal to a corresponding infrared receiver 23, so that an infrared light net is formed between the plurality of infrared transmitters 22 and the plurality of infrared receivers 23.

When a writing operation is performed by the writing tool on the surface of the pressure-sensitive writing panel 1, a part of infrared light in the infrared light net is shielded by the writing tool. At this time, it is impossible for the infrared receiver 23 corresponding to a shielded region to receive the infrared signal from the corresponding infrared transmitter 22, so a monitoring signal is generated and transmitted to the controller. The controller determines the position information about the writing tool in accordance with the received monitoring signal, determines the writing trajectory information about the writing tool on the surface of the pressure-sensitive writing panel 1, and transmits the determined writing trajectory information to the storage unit coupled to the controller for storage.

In this way, when the writing operation is being performed by a user on the pressure-sensitive writing panel 1, it is further able to store the writing trajectory information to form a historical writing trajectory. Even when a current content has been erased, it is still able to restore and review the erased content in accordance with the stored writing trajectory information.

In some embodiments of the present disclosure, as shown in FIG. 1, each infrared touch frame 21 further includes an infrared light guide element 24 arranged between the infrared transmitter 22 and the infrared receiver 23, and configured to filter the infrared light from the infrared transmitter 22 so as to provide more even infrared light.

According to the pressure-sensitive writing board in this embodiment of the present disclosure, through the writing monitoring unit 2, it is able for the user to position the writing tool when the writing operation is performed on the pressure-sensitive writing panel 1, convert the position information about the writing tool into the writing trajectory information, and store the writing trajectory information, so as to form the historical writing trajectory. As a result, it is able for the user to review the erased contents in time, thereby to improve the practicability of the pressure-sensitive writing board.

In some embodiments of the present disclosure, the pressure-sensitive writing panel 1 further includes a pressure-sensitive display module 11 configured to present a writing trajectory in a predetermined color in accordance with the writing trajectory information at a region where a pressure is applied.

In some embodiments of the present disclosure, the pressure-sensitive writing panel 1 is configured to present the writing trajectory in the predetermined color in accordance with the writing trajectory information at the region where the pressure is applied when it is powered off.

In some embodiments of the present disclosure, the pressure-sensitive writing panel 1 is further configured to erase the writing trajectory under the effect of a predetermined pulse electric field.

To be specific, as shown in FIG. 1, the pressure-sensitive display module 11 includes a first substrate 111, a second substrate 112, a first conductive layer 113, a second conductive layer 114 and a liquid crystal layer 115. The first substrate 111 is arranged opposite to the second substrate 112, the first conductive layer 113 is attached to the first substrate 111 and faces the second substrate 112, the second conductive layer 114 is attached to the second substrate 112 and faces the first substrate 111, and the liquid crystal layer 115 is arranged between the first conductive layer 113 and the second conductive layer 114. The first substrate 111 is a flexible substrate, and the first conductive layer 113 and the second conductive layer 114 are transparent conductive layers.

When a pressure is applied by the writing tool onto the first substrate 111, an arrangement mode of liquid crystals in the liquid crystal layer 115 corresponding to a region of the first substrate 111 where the pressure is applied changes in such a manner as to reflect light at a predetermined wavelength, so as to present the writing trajectory in the predetermined color. When the predetermined pulse electric field is applied to the first conductive layer and the second conductive layer at the region where the writing trajectory in the predetermined color is presented, the arrangement mode of the liquid crystals in the liquid crystal layer corresponding to the region where the writing trajectory in the predetermined color is presented restores to its initial state, so as to erase the writing trajectory.

In the case of no electric field, the arrangement mode of the liquid crystals at the region of the first substrate 111 where the pressure is applied may not restore to an original state, so the writing trajectory in the predetermined color may not disappear. When it is necessary to erase the content, the predetermined pulse electric field may be applied to the region where the writing trajectory in the predetermined color is presented. At this time, the arrangement mode of the liquid crystals in the liquid crystal layer 115 corresponding to the region where the writing trajectory in the predetermined color is presented may restore to its initial state, and the writing trajectory may be erased.

Due to the pressure-sensitive liquid crystals, the arrangement of the liquid crystals is changed when the writing operation is performed on the pressure-sensitive display module 11, so it is able to display the writing trajectory through reflection without any light source or power consumption. In addition, it is merely necessary to erase the writing trajectory through a tiny voltage, so it is able to, while reducing the power consumption, achieve a long-term use through the reflection of natural light without any damage to user's vision. The liquid crystals include bistable cholesteric liquid crystals.

In some embodiments of the present disclosure, the second substrate includes a black reflective substrate.

In order to be adapted to a user's writing habit and enable the pressure-sensitive writing panel 1 to be more approximate to a traditional blackboard, the second substrate 112 may be a black reflective substrate, so as to increase display contrast when the light is reflected by the liquid crystal layer 115.

In some embodiments of the present disclosure, the pressure-sensitive writing panel further includes a protection layer attached to a surface of the pressure-sensitive display module where a pressure is applied.

In some embodiments of the present disclosure, the protection layer (not shown) is attached to the surface of the pressure-sensitive display module 11 where a pressure is applied, i.e., attached to a surface of the first substrate 111 where the pressure is applied.

In some embodiments of the present disclosure, the protection layer may include a flexible soft film subjected to atomization and hardening treatment, so as to reduce light reflection in use, prevent the pressure-sensitive writing board from being scratched, and achieve an effect approximate to a real blackboard. In addition, it is able to protect the first substrate 111, thereby to increase a service life of the pressure-sensitive writing board.

In some embodiments of the present disclosure, when merely a writing function and a one-key erasing function are required, it is merely necessary to apply a tiny voltage between the first conductive layer 113 and the second conductive layer 114 to erase all the writing trajectories. When a topical erasing function is required, it is necessary to form the first conductive layer 113 and the second conductive layer 114 into grids. A first conductive grid in the first conductive layer 113 and a corresponding second conductive grid in the second conductive layer 114 together define a pixel region, and a circuit design is performed in each pixel region. An erasing position is determined through the above-mentioned infrared touch frames 21, and a pixel-level voltage is applied at the erasing position so as to achieve the topical erasing function.

Figure 2:
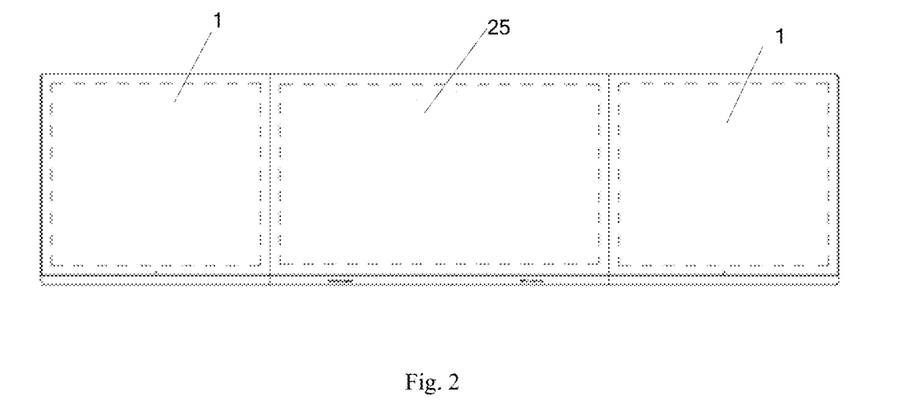
FIG. 2 is another schematic view showing the pressure-sensitive writing board according to one embodiment of the present disclosure.

As shown in FIG. 2, based on the above, the writing monitoring unit 2 may further include a display panel 25, e.g., a display panel in an electronic whiteboard. The display panel 25 is coupled to the controller. The controller is configured to transmit a content corresponding to the writing trajectory information to the display panel 25, so as to display the content for interaction. In addition, the display panel 25 is further configured to display a content played by a terminal coupled thereto.

In this way, the pressure-sensitive writing panel 1 is used for writing, while the display panel 25 is used for displaying the written content and/or the content played by the terminal, i.e., it is able to perform the writing operation and a display operation simultaneously, and prevent a switching operation between a writing mode and a display mode when merely an electronic whiteboard is adopted, thereby to further improve the practicability of the pressure-sensitive writing board. The quantity of display panel 25 may be one, and the quantity of pressure-sensitive writing panels 1 may be one or more.

Generally, when the content played by the terminal is displayed on the display panel 25 in a separate manner from the content written by the user on the pressure-sensitive writing board, an interactive effect may be adversely affected. In order to improve the interactive effect, the controller is configured to control the pressure-sensitive writing panel 1 to display the played content synchronously. In this way, the user may directly perform a marking or writing operation on the content played by the terminal and displayed on the pressure-sensitive writing panel 1, and meanwhile the played content and the written content may be displayed simultaneously on the display panel 25. In this way, it is able for audiences to understand the content played by the terminal in a better manner.

To be specific, in order to reduce power consumption, usually the pressure-sensitive writing panel 1 is not powered on all the time. However, when the user needs to perform the marking or writing operation on the content played by the terminal, a relevant control button may be pressed so that the pressure-sensitive writing panel 1 is in a power-on state. Upon the receipt of the content played by the terminal and displayed by the display panel 25, the controller may determine mapping coordinates of the played content in the pressure-sensitive writing panel 1 in accordance with a correspondence between coordinates in the display panel and coordinates in the pressure-sensitive writing panel 1, and change the arrangement mode of the liquid crystals through changing a pulse electric field applied to a pixel region where the mapping coordinates of the content played by the terminal in the pressure-sensitive writing panel 1 (this pulse electric field is different from that used for erasing the writing trajectory), so that the played content is displayed by the pressure-sensitive writing panel 1 synchronously and the user is capable of performing the marking or writing operation at a desired region. In this way, the content played by the terminal and the content written by the user may be displayed by the pressure-sensitive writing panel 1 synchronously.

In some embodiments of the present disclosure, when the pressure-sensitive writing panel 1 has a small size and the content played by the terminal is displayed, the writing operation of the user may be adversely affected. Hence, after the controller has determined the mapping coordinates of the played content in the pressure-sensitive writing panel 1 in accordance with the correspondence between the coordinates in the display panel 25 and the coordinates in the pressure-sensitive writing panel 1, the controller may merely control the pressure-sensitive writing panel 1 to display a writing region corresponding to the mapping coordinates but not display the played content. At this time, the user may perform the writing operation at the writing region corresponding to the mapping coordinates. In this way, it is able to prevent the writing operation from being adversely affected, and provide coarse association between the written content and the played content.

To be specific, after the mapping coordinates of the played content in the pressure-sensitive writing panel 1 has been determined, the mapping coordinates of the played content in the pressure-sensitive writing panel 1 is selected through a pattern such as box or circle as the writing region corresponding to the mapping coordinates of the played content in the pressure-sensitive writing panel 1, and the pattern is displayed through changing a pulse electric field applied to a pixel region where edges of the pattern are located. Then, the user may perform the writing operation in the pattern.

In order to achieve a better interactive effect and perform the writing operation and the display operation simultaneously, usually the pressure-sensitive writing panel 1 needs to be used in conjunction with the display panel 25. However, due to a positioning principle of the infrared touch frames 21, the infrared touch frame 21 needs to be placed at a position much higher than the writing surface of the pressure-sensitive writing panel 1. After the pressure-sensitive writing panel 1 is coupled to the display panel 25, the infrared touch frame is not located on a same plane as the writing surface of the pressure-sensitive writing panel 1. At this time, the appearance of the product may be adversely affected, and thereby the integration between the pressure-sensitive writing panel 1 and the display panel 25 is not good. In order to solve the above problem, the present disclosure further provides the following technical solutions.

Figure 3:
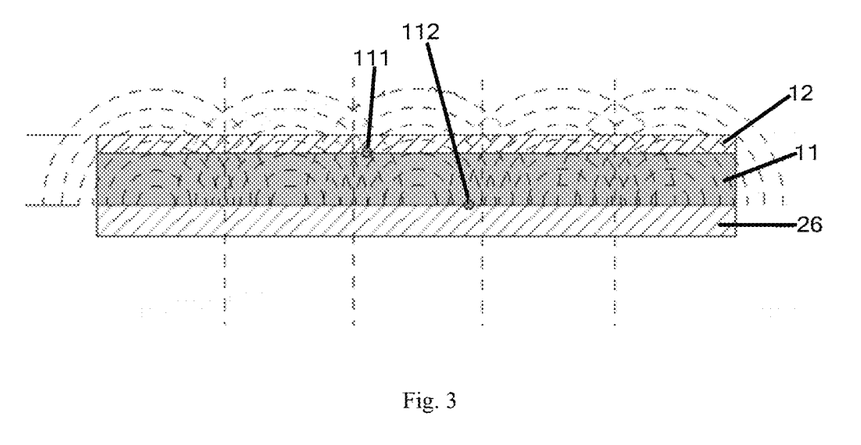
FIG. 3 is yet another schematic view showing the pressure-sensitive writing board according to one embodiment of the present disclosure.

As shown in FIG. 3, different from the pressure-sensitive writing board mentioned hereinabove, an electromagnetic signal is used for positioning in the pressure-sensitive writing board. To be specific, as shown in FIG. 3, the writing monitoring unit 2 includes an electromagnetic induction layer 26, a controller (not shown) and a storage unit (not shown). The electromagnetic induction layer 26 is attached to a surface of the pressure-sensitive writing panel 1 away from the writing surface, the controller is coupled to the electromagnetic induction layer 26, and the storage unit is coupled to the controller. The electromagnetic induction layer 26 is configured to receive an electromagnetic signal from a first electromagnetic signal generator in the writing tool. The controller is configured to generate the writing trajectory information in accordance with the electromagnetic signal received by the electromagnetic induction layer 26, and transmit it to the storage unit. The storage unit is configured to store the writing trajectory information.

It should be appreciated that, the controller in the pressure-sensitive writing board in FIG. 1 may be a first controller, the controller in the pressure-sensitive writing board in FIG. 3 may be a second controller, and the first controller and the second controller may be the same or different. Identically, the storage unit in the pressure-sensitive writing board in FIG. 1 may be a first storage unit, the storage unit in the pressure-sensitive writing board in FIG. 2 may be a second storage unit, and the first storage unit and the second storage unit may be the same or different.

In some embodiments of the present disclosure, the electromagnetic induction layer 26 may be an antenna board for outputting a superimposed antenna signal. Although the electromagnetic induction layer is arranged at a rear side of the pressure-sensitive display module 11 (i.e., at a side away from the surface of the pressure-sensitive display module where the pressure is applied), there is a certain transmission distance for the outputted signal. Hence, a maximum value n of a total thickness of the pressure-sensitive writing panel may be determined in accordance with a sum of densities of antenna arrays on the electromagnetic induction layer 26. The total thickness of the pressure-sensitive writing panel is a distance between a surface of the protection layer 12 away from the pressure-sensitive display module 11 and a surface of the pressure-sensitive display module 11 adjacent to the electromagnetic induction layer 26. To be specific, the maximum value n is positively associated with the sum of densities of the antenna arrays on the electromagnetic induction layer 26, i.e., the larger the sum, the larger the value of n. It is able to monitor the writing tool only when the total thickness does not exceed the maximum value n.

To be specific, when the writing tool capable of generating the electromagnetic signal moves on the surface of the protection layer 12, it may cut a magnetic field on the antenna board, and thereby an electric signal generated by the antenna board may change. Through positioning different electromagnetic signals, a sensing chip on the antenna board may accurately determine a position of the first electromagnetic signal generator in the writing tool. Since the first electromagnetic signal generator is fixed in the writing tool, it is able to determine the position information about the writing tool, thereby to determine the writing trajectory information.

In some embodiments of the present disclosure, the electromagnetic induction layer includes an antenna board, conductive layers extending in a first direction and a second direction are arranged on the antenna board, and the second direction is perpendicular to the first direction.

Figure 4:
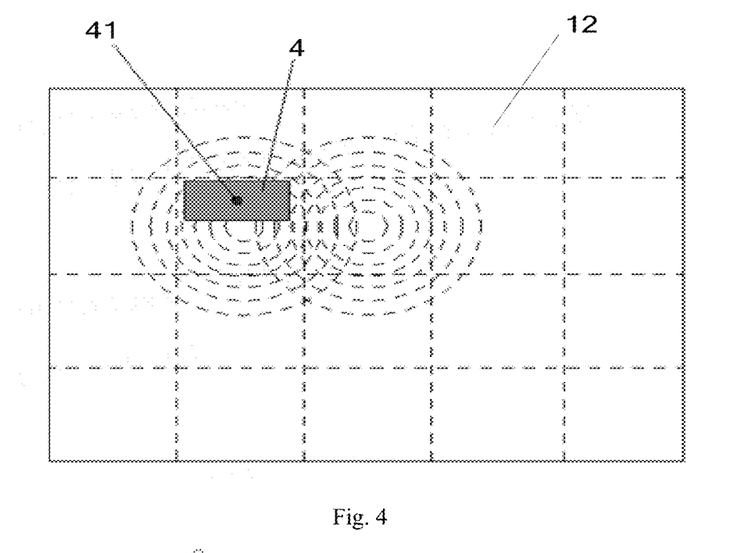
FIG. 4 is a view showing a principle of an erasing and positioning operation for the pressure-sensitive writing board according to one embodiment of the present disclosure.

FIG. 4 shows a principle of an erasing and positioning operation for the pressure-sensitive writing board. As shown in FIG. 4, copper strips are evenly arranged in columns and rows on the antenna board, so as to define a plurality of boxes, thereby to generate alternating-current magnetic fields on the surface of the protection layer 12 above the antenna board within a certain height range in an even and superimposed manner. When an erasing tool 4 capable of transmitting the electromagnetic signal moves on the surface of the protection layer 12, it may cut the magnetic field on the antenna board, and an electric signal generated by the antenna board may change. Through positioning different electromagnetic signals, the sensing chip on the antenna board may accurately determine a position of a second electromagnetic signal generator 41 in the erasing tool 4. Since the second electromagnetic signal generator 41 is fixed in the erasing tool 4, it is able to determine position information about the erasing tool 4, thereby to perform a topical erasing operation on the pressure-sensitive board.

In some embodiments of the present disclosure, the writing monitoring unit 2 may further include the display panel 25, so as to perform the writing operation and the display operation simultaneously. A specific implementation process is the same as that shown in FIG. 2, and thus will not be particularly defined herein.

Referring to FIG. 1 again, the liquid crystal layer 115 of the pressure-sensitive display module 11 in the pressure-sensitive writing panel 1 may be a cholesteric liquid crystal layer having a bistable characteristic and arranged between two transparent conductive layers. The first substrate 111 is a flexible transparent substrate so as to allow external light to pass therethrough into the cholesteric liquid crystal layer. The second substrate 112 is a black reflective substrate so as to increase display contrast when the light is reflected by the liquid crystal layer.

Figure 5:
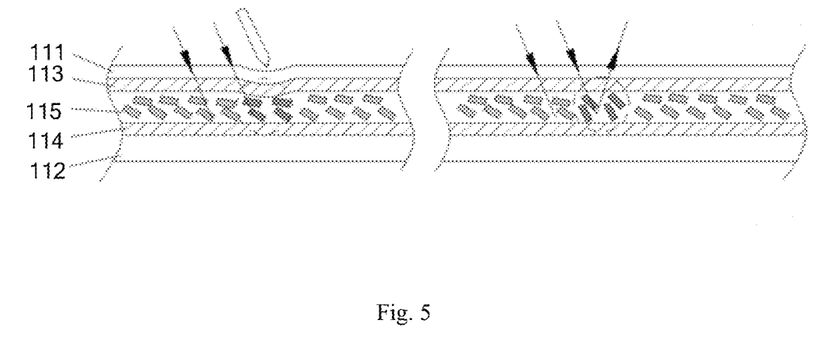
FIG. 5 is a view showing a principle of a writing operation for a pressure-sensitive display module according to one embodiment of the present disclosure.

FIG. 5 shows a principle of the writing operation for the pressure-sensitive display module in FIG. 1. As shown in FIG. 5, when the writing operation is performed on the flexible transparent substrate, a pressure is applied by a tip of a stylus to the flexible transparent substrate and then to liquid crystals in the liquid crystal layer 115, so as to change an arrangement mode of the liquid crystals in such a manner as to reflect light at a specific wavelength, thereby to present the writing trajectory in the predetermined color. When no electric field is applied between the first conductive layer 113 and the second conductive layer 114, the arrangement mode of the liquid crystals in the liquid crystal layer 115 may not restore to its original state, so the writing trajectory may not disappear. When a pulse electric field is applied between the first conductive layer 113 and the second conductive layer 114, the arrangement mode of the liquid crystals may restore to its original state under the effect of the pulse electric field, and the writing trajectory may disappear.

When merely a writing function and a one-key erasing function are required, it is merely necessary to apply a tiny voltage between the first conductive layer 113 and the second conductive layer 114 to erase all the writing trajectories. When a topical erasing function is required, it is necessary to form the first conductive layer 113 and the second conductive layer 114 into grids. A first conductive grid in the first conductive layer 113 and a corresponding second conductive grid in the second conductive layer 114 together define a pixel region, and a circuit design is performed in each pixel region. An erasing position is determined through the above-mentioned infrared touch frames, and a pixel-level voltage is applied at the erasing position so as to erase the writing trajectory. In addition, the infrared touch frame is also able to help determining the writing trajectory information, so the writing trajectory may be stored and transmitted to an electronic whiteboard for synchronous display.

Based on the above, due to the pressure-sensitive liquid crystals, the arrangement of the liquid crystals is changed when the writing operation is performed, so it is able to display the writing trajectory through reflection without any power consumption. In addition, it is merely necessary to erase the writing trajectory through a tiny voltage, so it is able to reduce the power consumption for the electronic whiteboard, and achieve a long-term use through the reflection of natural light without any damage to user's vision. The liquid crystals include bistable cholesteric liquid crystals.

The infrared touch frame is added so as to achieve the topical erasing function and store data. However, as shown in FIG. 1, due to an operating principle of the infrared touch frame, the infrared touch frame needs to be placed at a position much higher than the writing surface of the pressure-sensitive writing panel. After the pressure-sensitive writing panel is coupled to the display panel, the infrared touch frame is not located on a same plane as the writing surface of the pressure-sensitive writing panel. Hence, a writing plane needs to be on a same plane as a touch plane, so as to improve the connection with the electronic whiteboard. When a resistive or capacitive touch scheme is adopted, a glass layer is arranged on the top, so it is impossible to change the arrangement of the liquid crystals when a pressure is applied to the rigid glass layer, and thereby it is impossible to achieve a display effect. In this regard, the present disclosure further provides the following technical solution.

In some embodiments of the present disclosure, the writing function and the high-precision topical erasing function may be achieved on a common operational plane. As shown in FIG. 3, the pressure-sensitive writing board includes the pressure-sensitive display module 11 for the writing function with reduced power consumption, so it is necessary to provide it with the topical erasing function as well as a same writing feel as the blackboard. At this time, it is necessary to perform a touch operation in a non-direct-touch manner without adversely affecting the writing operation. The first substrate 111 of the pressure-sensitive display module 11 is a flexible transparent substrate, and in order to enable it to be more like a surface of the real blackboard, the flexible protection layer 12 needs to be attached thereto. The protection layer needs to be subjected to surface treatment to provide excellent bending resistance, and subjected to atomization and hardening treatment, so as to reduce light reflection in use, prevent the pressure-sensitive writing board from being scratched, and achieve an effect approximate to the real blackboard. An upper surface of the protection layer is both the writing surface and a touch surface.

The electromagnetic induction layer 26 is an antenna board for outputting a superimposed antenna signal. Although the electromagnetic induction layer is arranged at a rear side of the pressure-sensitive display module, there is a certain transmission distance for the outputted signal. A maximum height n (e.g., 20 mm) of the upper surface of the protection layer 12 relative to a surface of the pressure-sensitive display module adjacent to the electromagnetic induction layer may be determined in accordance with a density of an antenna array on the electromagnetic induction layer. It is able to monitor the writing tool or the erasing tool as long as the height of the upper surface of the protection layer 12 is smaller than the value of n.

The present disclosure further provides in some embodiments a pressure-sensitive writing device including an erasing tool and the above-mentioned pressure-sensitive writing board.

In some embodiments of the present disclosure, the erasing tool includes a second electromagnetic signal generator. The writing monitoring unit in the pressure-sensitive writing board includes: an electromagnetic induction layer attached to a surface of the pressure-sensitive writing panel away from a writing surface of the pressure-sensitive writing panel and configured to receive an electromagnetic signal from the second electromagnetic signal generator; and a controller coupled to the electromagnetic induction layer, and configured to determine a position of the second electromagnetic signal generator in accordance with the electromagnetic signal. The controller is further configured to erase the writing trajectory information at a predetermined position in accordance with the position of the second electromagnetic signal generator.

In some embodiments of the present disclosure, the writing monitoring unit includes: two infrared touch frames arranged opposite to each other at two ends of the pressure-sensitive writing panel respectively, each infrared touch frame being provided with a plurality of infrared transmitters and a plurality of infrared receivers corresponding to the plurality of infrared transmitters respectively, an infrared light net being formed between the plurality of infrared transmitters and the plurality of infrared receivers, a part of infrared light in the infrared light net being shielded when the erasing tool moves at the writing region, and a monitoring signal being generated by the infrared receiver corresponding to a shielded region; and a controller coupled to each infrared transmitter and each infrared receiver, and configured to determine position information about the erasing tool at the writing region in accordance with the monitoring signal. The controller is further configured to erase the writing trajectory information at a predetermined position in accordance with the position information about the erasing tool.

It should be appreciated that, some or similar contents in the above embodiments of the present disclosure may be omitted.

It should be further appreciated that, such words as "first" and "second" are merely used to differentiate different components rather than to represent any order, number or importance. Further, such phrase as "a plurality of" is used to indicate that there are at least two components, unless otherwise specified.

Such phrases as "one embodiment", "embodiments", "examples" and "for example" intend to indicate that the features, structures or materials are contained in at least one embodiment or example of the present disclosure, rather than referring to an identical embodiment or example. In addition, the features, structures or materials may be combined in any embodiment or embodiments in an appropriate manner. In the case of no conflict, the embodiments or examples or the features therein may be combined in any form.

The above embodiments are for illustrative purposes only, but the present disclosure is not limited thereto. Apparently, a person skilled in the art may make further modifications and improvements without departing from the spirit of the present disclosure, and these modifications and improvements shall also fall within the scope of the present disclosure.

What is claimed is:

1. A pressure-sensitive writing board, comprising:
   a pressure-sensitive writing panel configured to form a writing region; and
   a writing monitoring unit configured to determine position information about a writing tool at the writing region, convert the position information into writing trajectory information, and store the writing trajectory information,
   wherein the pressure-sensitive writing panel is further configured to present the writing trajectory information at the writing region;
   wherein the pressure-sensitive writing panel comprises a pressure-sensitive display module configured to present a writing trajectory in a predetermined color in accordance with the writing trajectory information at a region where a pressure is applied;
   wherein the pressure-sensitive display module is further configured to erase the writing trajectory under the effect of a predetermined pulse electric field;
   wherein the pressure-sensitive writing panel further comprises a protection layer attached to a surface of the pressure-sensitive display module where a pressure is applied;
   wherein the protection layer comprises a flexible soft film subjected to atomization and hardening treatment;
   wherein the writing monitoring unit comprises an electromagnetic induction layer attached to a surface of the pressure-sensitive writing panel away from a writing surface of the pressure-sensitive writing panel, a maximum value of a total thickness of the pressure-sensitive writing panel is positively associated with a sum of densities of antenna arrays on the electromagnetic induction layer, and the total thickness of the pressure-sensitive writing panel is a distance between a surface of the protection layer away from the pressure-sensitive display module and a surface of the pressure-sensitive display module adjacent to the electromagnetic induction layer.

2. The pressure-sensitive writing board according to claim 1, wherein the writing monitoring unit comprises:
   two infrared touch frames arranged opposite to each other at two ends of the pressure-sensitive writing panel respectively, each infrared touch frame being provided with a plurality of infrared transmitters and a plurality of infrared receivers corresponding to the plurality of infrared transmitters respectively, an infrared light net being formed between the plurality of infrared transmitters and the plurality of infrared receivers, a part of infrared light in the infrared light net being shielded when a writing operation is performed by the writing tool at the writing region, and a monitoring signal being generated by the infrared receiver corresponding to a shielded region;
   a controller coupled to each infrared transmitter and each infrared receiver, and configured to determine the writing trajectory information about the writing tool at the writing region in accordance with the monitoring signal; and
   a storage unit coupled to the controller and configured to store the writing trajectory information.

3. The pressure-sensitive writing board according to claim 1, wherein the writing tool comprises a first electromagnetic signal generator,
   wherein the writing monitoring unit comprises:
   an electromagnetic induction layer attached to a surface of the pressure-sensitive writing panel away from a writing surface of the pressure-sensitive writing panel, and configured to receive an electromagnetic signal from the first electromagnetic signal generator;
   a controller coupled to the electromagnetic induction layer and configured to generate the writing trajectory information in accordance with the electromagnetic signal; and
   a storage unit coupled to the controller and configured to store the writing trajectory information.

4. The pressure-sensitive writing board according to claim 3, wherein the writing monitoring unit further comprises a display panel coupled to the controller and configured to display a content corresponding to the writing trajectory information, a content played by a terminal coupled to the display panel, or both, and one or more pressure-sensitive writing panels are arranged at one or more sides of the display panel and spliced with the display panel.

5. The pressure-sensitive writing board according to claim 4, wherein the controller is further configured to control the pressure-sensitive writing panel to display the played content synchronously.

6. The pressure-sensitive writing board according to claim 5, wherein the controller is further configured to determine mapping coordinates of the played content in the pressure-sensitive writing panel in accordance with a correspondence between coordinates in the display panel and coordinates in the pressure-sensitive writing panel, and control the pressure-sensitive writing panel to display a writing region corresponding to the mapping coordinates.

7. The pressure-sensitive writing board according to claim 1, wherein the electromagnetic induction layer comprises an antenna board, conductive lines extending in a first direction and a second direction are arranged on the antenna board, and the second direction is perpendicular to the first direction.

8. The pressure-sensitive writing board according to claim 1, wherein the pressure-sensitive display module comprises:
   a first substrate and a second substrate arranged opposite to the first substrate, the first substrate being a flexible substrate;
   a first conductive layer attached to the first substrate and facing the second substrate;
   a second conductive layer attached to the second substrate and facing the first substrate; and
   a liquid crystal layer arranged between the first conductive layer and the second conductive layer.

9. The pressure-sensitive writing board according to claim 8, wherein when a pressure is applied to the first substrate, an arrangement mode of liquid crystals in the liquid crystal layer corresponding to a region of the first substrate where the pressure is applied changes in such a manner as to reflect light at a predetermined wavelength, so as to present the writing trajectory in the predetermined color; and
   when the predetermined pulse electric field is applied to the first conductive layer and the second conductive layer at the region where the writing trajectory in the predetermined color is presented, the arrangement mode of the liquid crystals in the liquid crystal layer corresponding to the region where the writing trajectory in the predetermined color is presented restores to its initial state so as to erase the writing trajectory.

10. The pressure-sensitive writing board according to claim 8, wherein the liquid crystal layer comprises bistable cholesteric liquid crystals.

11. The pressure-sensitive writing board according to claim 8, wherein the second substrate comprises a reflective substrate.

12. The pressure-sensitive writing board according to claim 8, wherein the first conductive layer comprises a plurality of first conductive grids, and the second conductive layer comprises a plurality of second conductive grids corresponding to the plurality of first conductive grids respectively.

13. A pressure-sensitive writing device, comprising an erasing tool and the pressure-sensitive writing board according to claim 1.

14. The pressure-sensitive writing device according to claim 13, wherein the erasing tool comprises a second electromagnetic signal generator,
wherein the writing monitoring unit in the pressure-sensitive writing board comprises:
an electromagnetic induction layer attached to a surface of the pressure-sensitive writing panel away from a writing surface of the pressure-sensitive writing panel and configured to receive an electromagnetic signal from the second electromagnetic signal generator; and
a controller coupled to the electromagnetic induction layer, and configured to determine a position of the second electromagnetic signal generator in accordance with the electromagnetic signal,
wherein the controller is further configured to erase the writing trajectory information at a predetermined position in accordance with the position of the second electromagnetic signal generator.

15. The pressure-sensitive writing device according to claim 13, wherein the writing monitoring unit comprises:
two infrared touch frames arranged opposite to each other at two ends of the pressure-sensitive writing panel respectively, each infrared touch frame being provided with a plurality of infrared transmitters and a plurality of infrared receivers corresponding to the plurality of infrared transmitters respectively, an infrared light net being formed between the plurality of infrared transmitters and the plurality of infrared receivers, a part of infrared light in the infrared light net being shielded when the erasing tool moves at the writing region, and a monitoring signal being generated by the infrared receiver corresponding to a shielded region; and
a controller coupled to each infrared transmitter and each infrared receiver, and configured to determine position information about the erasing tool at the writing region in accordance with the monitoring signal,
wherein the controller is further configured to erase the writing trajectory information at a predetermined position in accordance with the position information about the erasing tool.

\* \* \* \* \*